(12) United States Patent
Liu

(10) Patent No.: US 10,390,192 B2
(45) Date of Patent: Aug. 20, 2019

(54) AUTOMATIC GOODS CONSUMPTION JUDGMENT SYSTEM AND METHOD

(71) Applicant: Yu-Chen Liu, Guangdong (CN)

(72) Inventor: Yu-Chen Liu, Guangdong (CN)

(73) Assignee: Handle Tech (SZ) Co., Ltd., Shenzhen (CN)

( * ) Notice: Subject to any disclaimer, the term of this patent is extended or adjusted under 35 U.S.C. 154(b) by 106 days.

(21) Appl. No.: 15/866,516

(22) Filed: Jan. 10, 2018

(65) Prior Publication Data

US 2018/0132079 A1    May 10, 2018

(30) Foreign Application Priority Data

Apr. 1, 2017    (CN) .......................... 2017 1 0216061

(51) Int. Cl.
```
H04W 4/35      (2018.01)
H04W 4/38      (2018.01)
H04W 4/80      (2018.01)
G01G 19/414    (2006.01)
G01G 19/42     (2006.01)
```

(52) U.S. Cl.
CPC ............ *H04W 4/35* (2018.02); *G01G 19/414* (2013.01); *G01G 19/42* (2013.01); *H04W 4/38* (2018.02); *H04W 4/80* (2018.02)

(58) Field of Classification Search
CPC ........... H04W 4/35; H04W 4/38; H04W 4/80; G01G 19/414; G01G 19/42
USPC ....................................................... 235/385
See application file for complete search history.

(56) References Cited

U.S. PATENT DOCUMENTS

| | | | | |
|---|---|---|---|---|
| 2004/0226959 | A1* | 11/2004 | Mehus ................. | B01F 15/0445 222/1 |
| 2004/0230339 | A1* | 11/2004 | Maser .................. | G06Q 10/087 700/240 |
| 2008/0271928 | A1* | 11/2008 | Mehus .................. | G01G 21/23 177/1 |
| 2009/0151474 | A1* | 6/2009 | Mehus ..................... | G01G 3/14 73/862.52 |
| 2009/0171502 | A1* | 7/2009 | Freidin ................... | G01F 9/008 700/240 |
| 2009/0294469 | A1* | 12/2009 | Poulain .................. | G01G 13/00 222/1 |
| 2010/0147876 | A1* | 6/2010 | Mehus ..................... | G01G 3/14 222/1 |
| 2011/0165034 | A1* | 7/2011 | Carlson .................... | B67D 7/02 422/261 |

\* cited by examiner

*Primary Examiner* — Paultep Savusdiphol

(57) ABSTRACT

An automatic goods consumption judgment system includes a container tray system, a sensor measurement system, a supporting system, a mobile terminal device, a data transmission unit, a control and data processing system, and a cloud computer. Using the Internet of Things and cloud services, the consumption tendency and consumption state of goods are automatically measured in real time through the system, data are uploaded to a cloud server, and the cloud server sends analyzed and processed data to the terminal device used by users; customers are reminded of the consumption tendency and consumption state of goods according to the analysis and judgment obtained through cloud service computation, the consumption speed of goods and the fact whether required goods need to be prepared in advance or not are determined according to the analysis and judgment.

10 Claims, 4 Drawing Sheets

AUTOMATIC GOODS CONSUMPTION JUDGMENT SYSTEM AND METHOD

BACKGROUND OF THE INVENTION

Technical Field

The invention relates to the technical field of the Internet of Things and cloud computation, in particular, to an automatic goods consumption judgment system and method.

Description of Related Art

In daily life, the consumption state of living goods needs to be recorded and tracked in real time so that customers can be automatically reminded of the present consumption state of living goods and then can judge whether required living goods need to be purchased or not. Consumption prediction and automatic ordering for purchasing required goods provide convenience for users in life and avoid shortages of daily living goods, thereby being extremely important.

BRIEF SUMMARY OF THE INVENTION

To overcome the defects of the prior art, the invention provides an automatic goods consumption judgment system.

According to one technical scheme adopted by the invention: an automatic goods consumption judgment system comprises a container tray system used for storing a container for solid or liquid goods;

a sensor measurement system used for measuring the weight of size of goods;

a supporting system, wherein the supporting system is used for supporting measured goods, and the situation that a sensor system fails due to the fact that sensors of the measurement system are under the heavy load of goods for a long time is avoided through the supporting system;

a mobile terminal device;

a data transmission unit, wherein the data transmission unit is used for wireless/wired transmission of data, and thus the automatic goods consumption judgment system can be connected with the mobile terminal device of users conveniently;

a control and data processing system and a cloud computer, wherein the control and data processing system and the cloud computer are used for acquiring data by controlling the sensor measurement system and the supporting system, and transmitting data to the data transmission unit, and a transmitting device transmits data to a mobile phone or a network after cloud computation, so that intelligent control is achieved;

wherein, the container tray system is connected with the sensor measurement system, the sensor measurement system is connected with the supporting system and the control and data processing system, the control and data processing system is connected with the data transmission unit, and the data transmission unit and the cloud computer are connected with the mobile terminal device.

According to the automatic goods consumption judgment system of the invention, the container tray system comprises a container and a base tray.

According to the automatic goods consumption judgment system of the invention, the sensor measurement system comprises measurement sensors, a measurement data processing unit and a data processing control interface.

According to the automatic goods consumption judgment system of the invention, the supporting system comprises a support and an elevator.

According to the automatic goods consumption judgment system of the invention, the control and data processing system comprises a central processing unit, a display unit, a key unit, a control unit and an interface.

According to the automatic goods consumption judgment system of the invention, the mobile terminal device is a mobile phone or a tablet computer or a PC.

According to the automatic goods consumption judgment system of the invention, the data transmission unit is used for transmitting data to a cloud server and the cloud computer through WIFI, Bluetooth, Zigbee, GPRS/3G/4G and WAN/LAN.

According to another technical scheme adopted by the invention: an automatic goods consumption judgment method comprises the following steps that:

S1, after the automatic goods consumption system is powered on, whether the connection and operating states of all the systems of the automatic goods consumption system are normal or not is automatically judged at first, if not, an alarm is given out, and if yes, the automatic goods consumption system starts to operate normally;

S2, after it is automatically detected that all the systems are normal, the automatic goods consumption judgment system enters into the measurement mode, and the measurement system is started at a set measurement time or after a test and measurement start command sent from the terminal is received;

S3, after a weight measurement module is started for weight measurement, a lifting system is loaded at first, zero correction for a weight measurement sensor is conducted after the lifting system is started, and then the container tray system is loaded onto the measurement system through the elevator; after weight data are measured, the lifting system separates the container tray system from the weight sensor measurement system through the elevator, so that the weight sensor measurement system returns into the original state in which no load is applied to the weight sensor measurement system, and accordingly the situation that the weight measurement sensor deforms and fails under a heavy load for a long time is avoided;

S4, after a size measurement module is started, the size of goods is measured through an ultrasonic sensor or other sensors, and then changes of the goods are judged according to the size of the goods;

S5, after a liquid level measurement module is started, the liquid level of goods is measured through a floating ball or a photoelectric sensor or other sensors, and then changes of the goods are judged according to the liquid level of the goods;

S6, after a volume measurement module is started, the volume of goods is measured through a 3D scanner or other sensors, and then changes of the goods are judged according to the volume of the goods.

According to the automatic goods consumption method of the invention, measurement data obtained in the steps S1-S6 of the above method are processed in the control and data processing system at first and then transmitted to the cloud server by the data transmission unit through wireless/wired data transmission methods such as WIFI, Bluetooth, Zigbee, GPRS/3G/4G and WAN/LAN, and cloud server processes the received data through cloud computation and then transmits the processed data to the mobile terminal device.

According to the automatic goods consumption method of the invention, the measurement system in the step S2 comprises a weight measurement module, a size measurement module, a liquid level measurement module and a volume measurement module.

The automatic goods consumption judgment system and method of the invention have the following beneficial effects:

according to the automatic goods consumption system and method of the invention, by means of the IOT and cloud services, the consumption tendency and consumption state of goods are automatically measured in real time through the system, data are uploaded to the cloud server, and the cloud server processed data through cloud computation and then transmits the processed data to the terminal device, such as a mobile phone and a PC, used by users; customers are reminded of the consumption tendency and consumption state of goods according to the analysis and judgment obtained through cloud service computation, the consumption speed of goods and the fact whether required goods need to be prepared in advance or not are determined according to the analysis and judgment, or the time when an order needs to be automatically placed for purchasing required goods is determined according to the consumption speed of goods and the logistics transportation time; through the organic combination of the sensor measurement system and the supporting system, inaccurate measurement and failures caused by long-time use of measurement sensors are avoided.

BRIEF DESCRIPTION OF THE SEVERAL VIEWS OF THE DRAWINGS

A further description of the invention is given with the accompanying drawings and embodiments as follows, in the drawings.

DETAILED DESCRIPTION OF THE INVENTION

For a better understanding of the purposes, technical schemes and advantages of the invention, a further detailed description of the invention is given with the accompanying drawings and embodiments as follows. It should be understood that the embodiments in the following description are only used for explaining the invention instead of being used for limiting the invention.

Figure 1:
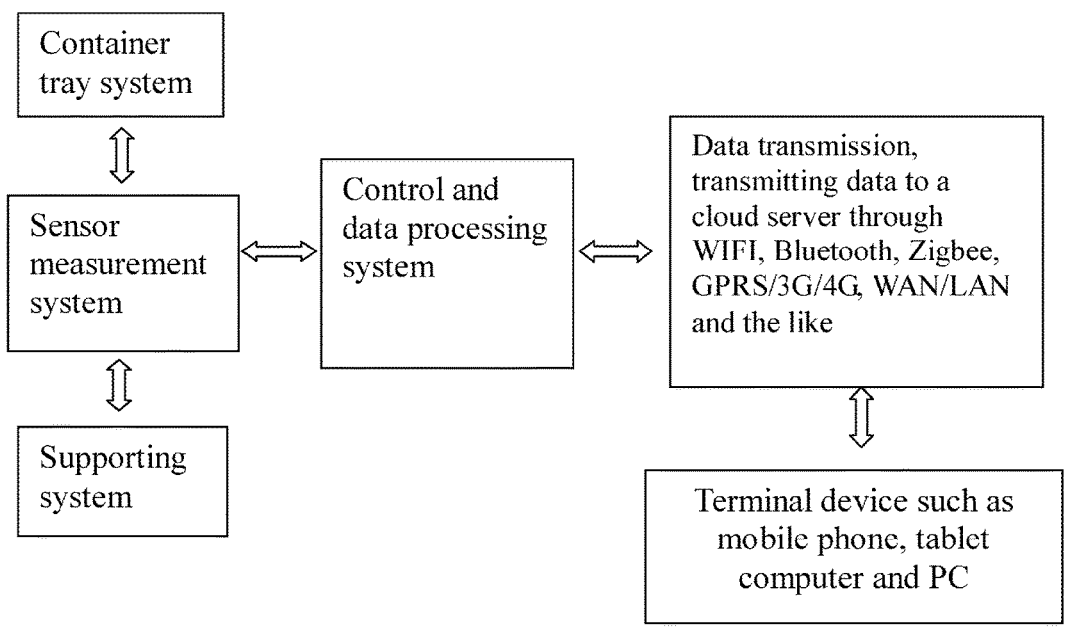
FIG. 1 is a block diagram of the application principle of an automatic goods consumption judgment system of the invention.
Figure 2:
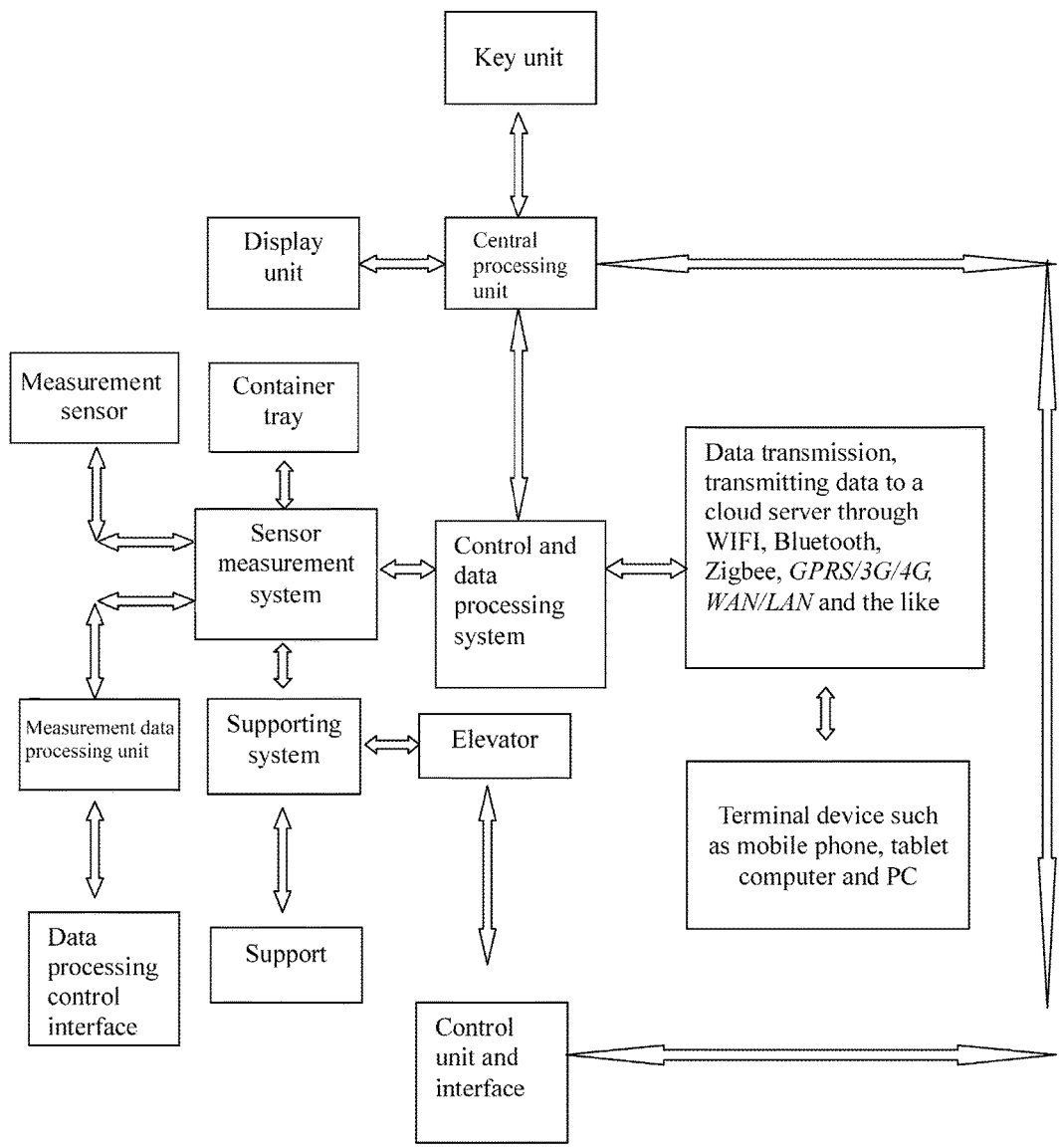
FIG. 2 is a structural diagram of the automatic goods consumption judgment system of the invention.

FIG. 1 and FIG. 2 show the block diagram of the application principle of an automatic goods consumption judgment system of the invention and the structural diagram of the automatic goods consumption judgment system of the invention respectively, and the automatic goods consumption judgment system comprises:

a container tray system used for storing a container for solid or liquid goods;

a sensor measurement system used for measuring the weight or size of the goods;

a supporting system, wherein the supporting system is used for supporting the measured goods, and the situation that a sensor system fails due to the fact that sensors of the measurement system are under the heavy load of the goods for a long time is avoided through the supporting system; according to the automatic goods consumption judgment system, the weight of the goods can be automatically loaded onto the measurement system through the supporting system in a certain time, so that the consumption state of the goods is measured regularly, data are transmitted to a cloud server, and the consumption change tendency of the goods is generated through cloud computation;

a mobile terminal device, wherein the mobile terminal device is a mobile phone or a tablet computer or a PC;

a data transmission unit, wherein the data transmission unit is used for wireless/wired transmission of data, and thus the automatic goods consumption judgment system can be connected with the mobile terminal device of users conveniently;

a control and data processing system, wherein the control and data processing system is used for acquiring data by controlling the sensor measurement system and the supporting system, and transmitting data to the data transmission unit, a transmitting device transmits data to the cloud server, and data are transmitted to a mobile phone or a network after cloud computation, so that intelligent control is achieved.

Wherein, the container tray system is connected with the sensor measurement system, the sensor measurement system is connected with the supporting system and the control and data processing system, the control and data processing system is connected with the data transmission unit, and the data transmission unit is connected with the cloud server and the mobile terminal device.

Users can judge the consumption tendency of goods according to analysis through cloud services and then manually or automatically places an order to purchase required goods. The weight of goods is measured through a sensor, consumption of the goods is judged according to the weight, and data are transmitted to the network and the cloud server through various wireless or wired methods. The size of goods is measured through a sensor, consumption of the goods is judged according to the size or shape of the goods, and data are transmitted to the network and the cloud server through various wireless or wired methods. The weight of goods is measured through a sensor, data are transmitted to the network and the cloud server through various wireless or wired methods, and consumption of the goods is judged according to the weight. The size of goods is measured through a sensor, data are transmitted to the network and the cloud server through various wireless or wired methods, and consumption of the goods is judged according to the size or the shape. The date when consumables are used up is predicted according to the consumption change tendency of consumables through cloud services and cloud computation, and users are informed of the date. The date when consumables are used up is predicted according to the consumption change tendency of the consumables through cloud services and cloud computation, and then required consumables are purchased automatically.

Specifically, the container tray system comprises a container and a base tray.

Specifically, the sensor measurement system comprises measurement sensors, a measurement data processing unit and a data processing control interface.

Specifically, the supporting system comprises a support and an elevator.

Specifically, the control and data processing system comprises a central processing unit, a display unit, a key unit, a control unit and an interface.

Specifically, the mobile terminal device is a mobile phone or a tablet computer or a PC.

Specifically, the data transmission unit is used for transmitting data to the cloud server through WIFI, Bluetooth, Zigbee, GPRS/3G/4G and WAN/LAN.

Figure 3:
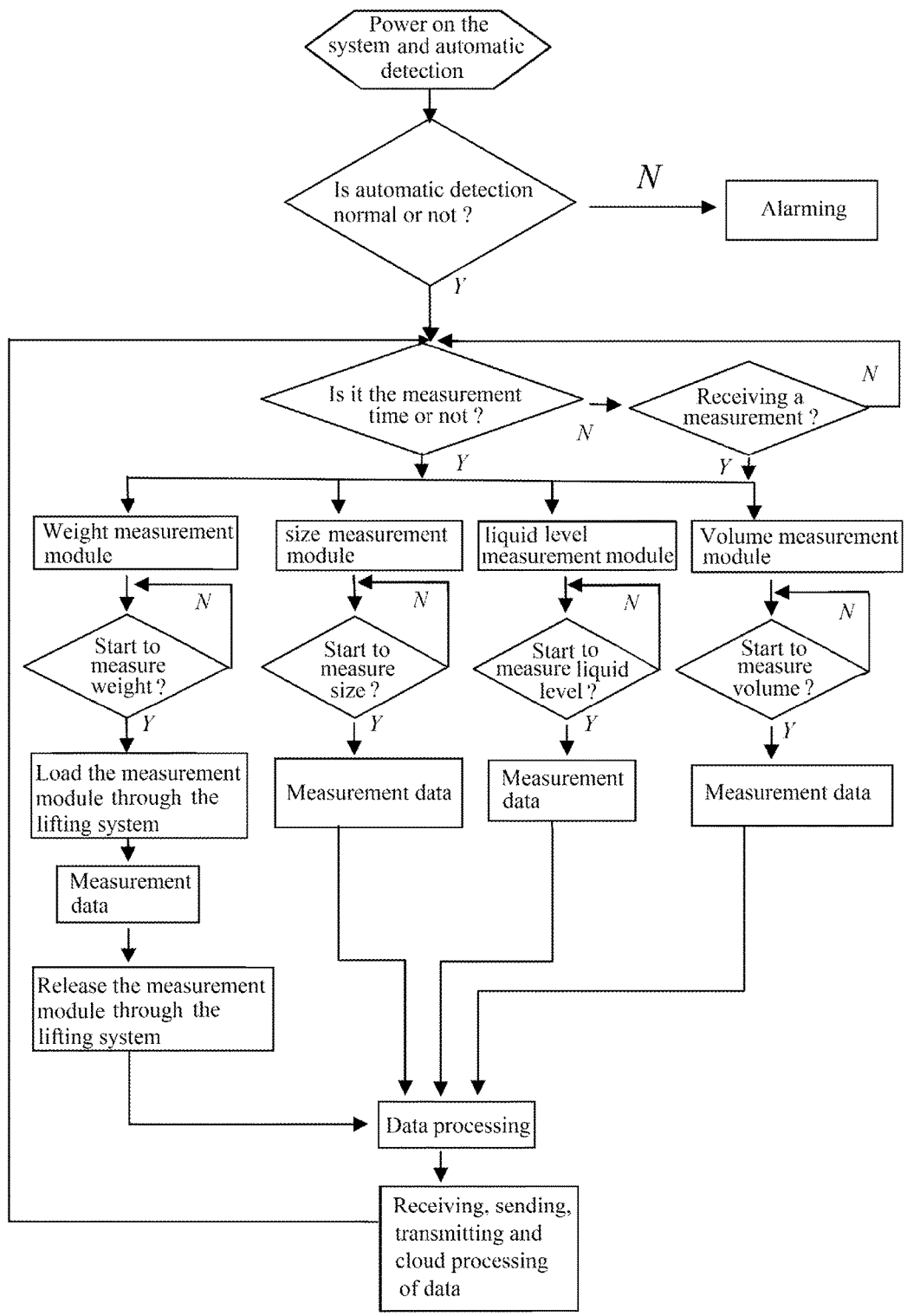
FIG. 3 is a work flow diagram of the automatic goods consumption judgment system of the invention.

FIG. 3 shows the work flow diagram of the automatic goods consumption judgment system of the invention, and the system enters into the measurement standby state instantly after being powered on, and the data measurement and data transmission process is shown in FIG. 2.

A detailed description of the work flow process of the automatic goods consumption judgment system is given as follows:

after the automatic goods consumption judgment system is powered on, whether the connection and operating states of all the systems of the automatic goods consumption judgment system are normal or not is detected automatically at first, if not, an alarm is given out, and if yes, the automatic goods consumption judgment system starts to operate normally.

After it is automatically detected that all the systems are normal, the automatic goods consumption judgment system enters into the measurement mode. The automatic goods consumption judgment system enters into the measurement mode through two methods, for one method, a time is set, and measurement is started at the set time; for the other method, measurement is started at any time when a test command sent from a terminal is received. The measurement system is started at the set measurement time or after a test and measurement start command sent from the terminal is received. The measurement system comprises a weight measurement module, a size measurement module, a liquid level measurement module and a volume measurement module. After the weight measurement module is started for weight measurement, a lifting system is loaded at first, zero correction for a weight measurement sensor is conducted after the lifting system is started, and then the container tray system is loaded onto the measurement system through the elevator; after weight data are measured, the lifting system separates the container tray system from the weight sensor measurement system through the elevator, so that the weight sensor measurement system returns into the original state in which no load is applied to the weight sensor measurement system, and accordingly, the situation that the weight sensor deforms and fails under a heavy load for a long time is avoided. After the size measurement module is started, the size of goods is measured through an ultrasonic sensor or other sensors, and then changes of the goods are judged according to the size of the goods. After the liquid level measurement module is started, the liquid level of goods is measured through a floating ball or a photoelectric sensor or other sensors, and then changes of the goods are judged according to the liquid level of the goods. After the volume measurement module is started, the volume of goods is measured through a 3D scanner or other sensors, and then changes of the goods are judged according to the volume of the goods. Measurement data obtained through the above method are processed in the control and data processing system at first and then transmitted to the cloud server by the data transmission unit through wireless/wired data transmission methods such as WIFI, Bluetooth, Zigbee, GPRS/3G/4G and WAN/LAN. The cloud server processes the received data through cloud computation and then transmits the processed data to the terminal device such as a mobile phone, a tablet computer and a PC.

Specifically, according to the sensor measurement method, the lifting system is used for loading the container tray system onto the measurement system and separating the container tray system from the measurement system, and all implementations adopting the combination method are within the protection scope of the invention.

Measurement data obtained through the above method are processed in the control and data processing system at first and then transmitted to the cloud server by the data transmission unit through wireless/wired data transmission methods such as WIFI, Bluetooth, Zigbee, GPRS/3G/4G and WAN/LAN. The cloud server processes the received data through cloud computation and then transmits the processed data to the terminal device.

Specifically, in the embodiment, the measurement system comprises a weight measurement module, a volume measurement module, a liquid level measurement module and a volume measurement module.

The measurement system can judge consumption of goods by measuring the weight of goods through an electronic balance, or by measuring the size of goods through ultrasonic waves, or by measuring the liquid level of goods through a floating ball or a photoelectric sensor, or by measuring data such as the weight, size, liquid level and volume of goods through a 3D scanner. Data are analyzed and processed through the cloud server and the receiving terminal device.

Figure 4:
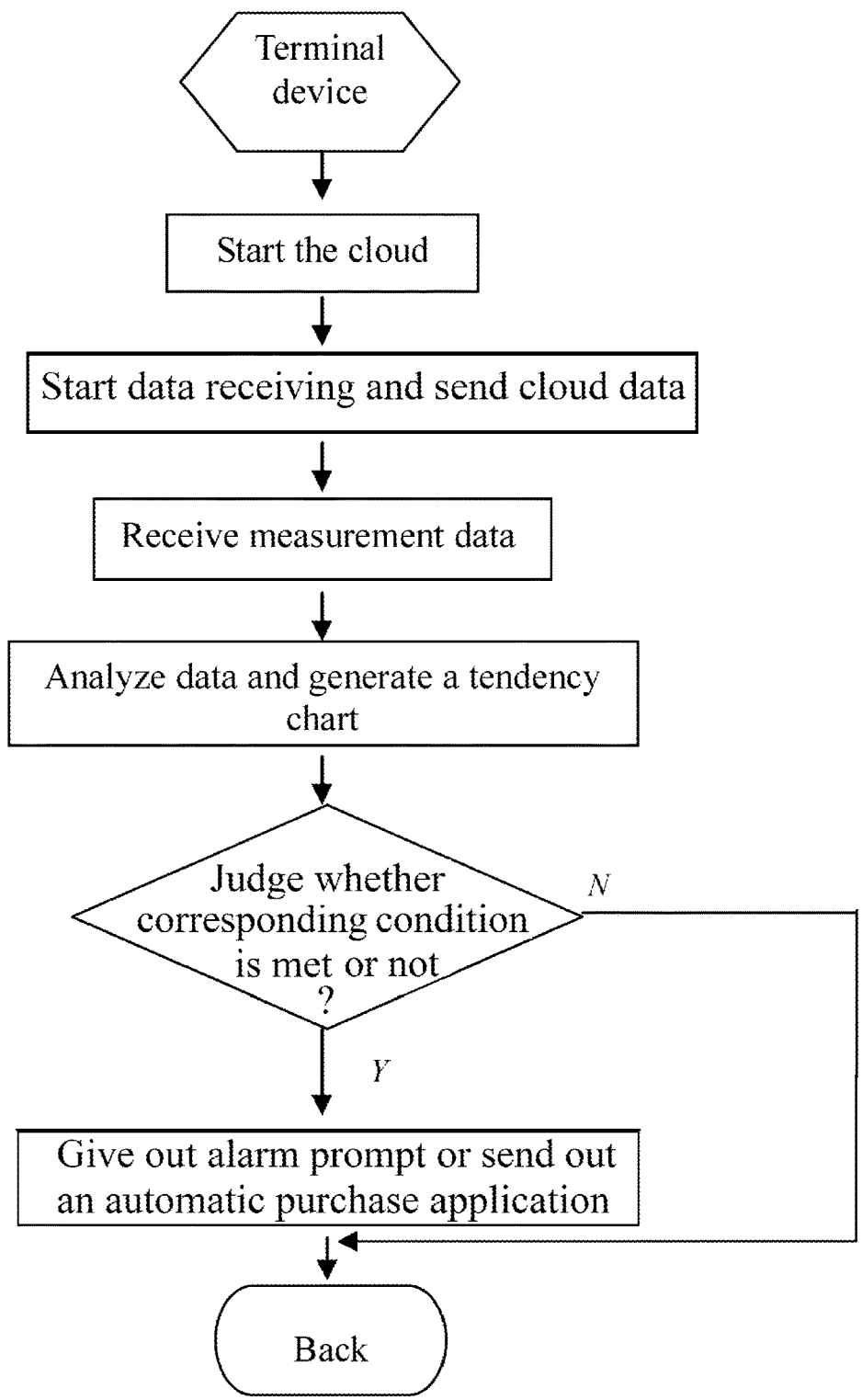
FIG. 4 is a work flow diagram of a terminal device of the automatic goods consumption judgment system of the invention.

FIG. 4 shows the work flow diagram and the data processing flow of the terminal device of the automatic goods consumption judgment system of the invention.

The terminal device is a mobile phone or a tablet computer or a PC. After the terminal is connected to an IOT device or the cloud server, the terminal can automatically receive measurement data sent from the IOT device or data processed by the cloud server through cloud computation, after the measurement data are received, the time when goods are about to be used up can be predicted according to the consumption change tendency of the goods, and an order can be placed automatically for purchasing required products in advance according to the logistics transportation time, so that goods shortages or expiration of time-limited goods (such as milk) is more effectively avoided, and a visual tendency chart which can be conveniently checked by users is generated.

In conclusion, the operating method of the TOT device, the data processing method of the cloud server, the data processing method of the receiving terminal, the combination method of the TOT device, the cloud server and the terminal device, and other methods which can achieve the above functional application are all within the protection scope of the invention patent.

According to the automatic goods consumption judgment system and method of the invention, by means of the Internet of Things and cloud services, the consumption tendency and consumption state of goods are automatically measured in real time through the system, data are uploaded to the cloud server, and the cloud server analyzes and processes data through cloud computation and then sends the analyzed and processed data to the terminal device (mobile phone, PC and the like) used by users; customers are reminded of the consumption tendency and consumption state of goods according to the analysis and judgment obtained through cloud service computation, the consumption speed of goods and the fact whether required goods need to be prepared in advance or not are determined according to the analysis and judgment, or the time when an order needs to be automatically placed for purchasing required goods is determined according to the consumption speed of goods and the logistics transportation time; through the organic combination of the sensor measurement system and the supporting system, inaccurate measurement and failures caused by long-time use of the measurement sensors are avoided.

Although the invention is disclosed through the above embodiments, the protection scope of the invention is not limited to the above embodiments, and transformations, substitutes and the like of the above components made without deviating from the concept of the invention are all within the claim scope of the invention.

What is claimed is:

1. An automatic goods consumption judgment system, characterized by comprising:
    a container tray system used for storing a container for solid or liquid goods;
    a sensor measurement system used for measuring the weight or size of goods;
    a supporting system, wherein the supporting system is used for supporting measured goods, and the situation that a sensor system fails due to the fact that sensors of the measurement system are under the heavy load of goods for a long time is avoided through the supporting system;
    a mobile terminal device;
    a data transmission unit, wherein the data transmission unit is used for wireless/wired transmission of data, and thus the automatic goods consumption judgment system can be connected with the mobile terminal device of users conveniently;
    a control and data processing system and a cloud computer, wherein the control and data processing system and the cloud computer are used for acquiring data by controlling the sensor measurement system and the supporting system, and transmitting data to the data transmission unit, and a transmitting device transmits data to a mobile phone or a network, so that intelligent control is achieved;
    wherein, the container tray system is connected with the sensor measurement system, the sensor measurement system is connected with the supporting system and the control and data processing system, the control and data processing system and the cloud computer are connected with the data transmission unit, and the data transmission unit is connected with the mobile terminal device.

2. The automatic goods consumption judgment system according to claim 1, characterized in that the container tray system comprises a container and a base tray.

3. The automatic goods consumption judgment system according to claim 1, characterized in that the sensor measurement system comprises measurement sensors, a measurement data processing unit and a data processing control interface.

4. The automatic goods consumption judgment system according to claim 1, characterized in that the supporting system comprises a support and an elevator.

5. The automatic goods consumption judgment system according to claim 1, characterized in that the control and data processing system comprises a central processing unit, a display unit, a key unit, a control unit and an interface.

6. The automatic goods consumption judgment system according to claim 1, characterized in that the mobile terminal device is a mobile phone or a tablet computer or a PC.

7. The automatic goods consumption judgment system according to claim 1, characterized in that the data transmission unit is used for transmitting data to a cloud server through WIFI, Bluetooth, Zigbee, GPRS/3G/4G and WAN/LAN.

8. An automatic goods consumption judgment method, characterized by comprising the following steps that:
    S1, after the automatic goods consumption system is powered on, whether the connection and operating states of all the systems of the automatic goods consumption system are normal or not is automatically judged at first, if not, an alarm is given out, and if yes, the automatic goods consumption system starts to operate normally;
    S2, after it is automatically detected that all the systems are normal, the automatic goods consumption judgment system enters into the measurement mode, and the measurement system is started at a set measurement time or after a test and measurement start command sent from the terminal is received;
    S3, after a weight measurement module is started for weight measurement, a lifting system is loaded at first, the zero point of a weight measurement sensor is corrected after the lifting system is started, and then the container tray system is loaded onto the measurement system through the elevator; after weight data are measured, the lifting system separates the container tray system from the weight sensor measurement system through the elevator, so that the weight sensor measurement system returns into the original state in which no load is applied to the weight sensor measurement system, and accordingly the situation that the weight measurement sensor deforms and fails under a heavy load for a long time is avoided;
    S4, after a size measurement module is started, the size of goods is measured through an ultrasonic sensor or other sensors, and then changes of the goods are judged according to the size of the goods;
    S5, after a liquid level measurement module is started, the liquid level of goods is measured through a floating ball or a photoelectric sensor or other sensors, and then changes of the goods are judged according to the liquid level of the goods;
    S6, after a volume measurement module is started, the volume of goods is measured through a 3D scanner or other sensors, and then changes of the goods are judged according to the volume of the goods.

9. The automatic goods consumption judgment method according to claim 8, characterized in that measurement data obtained in the steps S1-S6 of the above method are processed in the control and data processing system at first and then transmitted to the cloud server by the data transmission unit through wireless/wired data transmission methods such as WIFI, Bluetooth, Zigbee, GPRS/3G/4G and WAN/LAN, and cloud server processes the received data and then transmits the processed data to the mobile terminal device.

10. The automatic goods consumption judgment method according to claim 8, characterized in that the measurement system in the step S2 comprises a weight measurement module, a size measurement module, a liquid level measurement module and a volume measurement module.

* * * * *